Figures 5, 6:
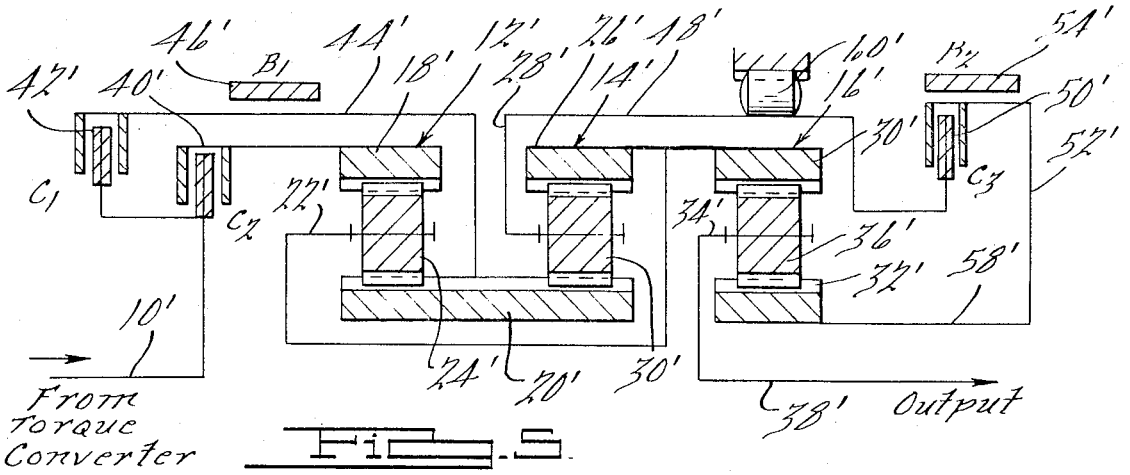

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 30, 1973

915 O.G. 1568

T915,010

FOUR-SPEED AUTOMATIC TRANSMISSION MECHANISM HAVING THREE SIMPLE PLANETARY GEAR UNITS

Larry A. Kepner, 22614 Alexandrine, Dearborn, Mich. 48124, and Po-Lung Liang, 36531 Sunnydale, Livonia, Mich. 48154

Continuation-in-part of abandoned application Ser. No. 111,997, Feb. 2, 1971. This application June 5, 1972, Ser. No. 259,749

Int. Cl. F16h *57/10*

U.S. Cl. 74—763

2 Sheets Drawing. 7 Pages Specification

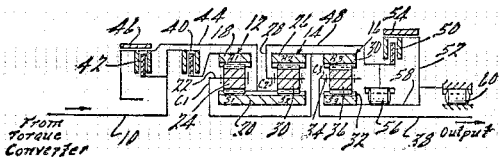

A four-speed ratio power transmission mechanism for use in an automotive vehicle driveline comprising three simple planetary gear units, each gear unit having a ring gear, a sun gear and a planetary carrier, the sun gear of the first and second gear units being common, the ring gear of the second and third gear units being common and five friction torque establishing devices for controlling the relative motion of the elements of the gear units thereby providing four forward driving speed ratios and a single reverse speed ratio wherein the ratio change between the two highest ratios is of a reduced magnitude and the torque ratios available during operation in the low speed range and in reverse are relatively high.

FOUR-SPEED AUTOMATIC TRANSMISSION MECHANISM
HAVING THREE SIMPLE PLANETARY GEAR UNITS

Filed June 5, 1972 2 Sheets-Sheet 1

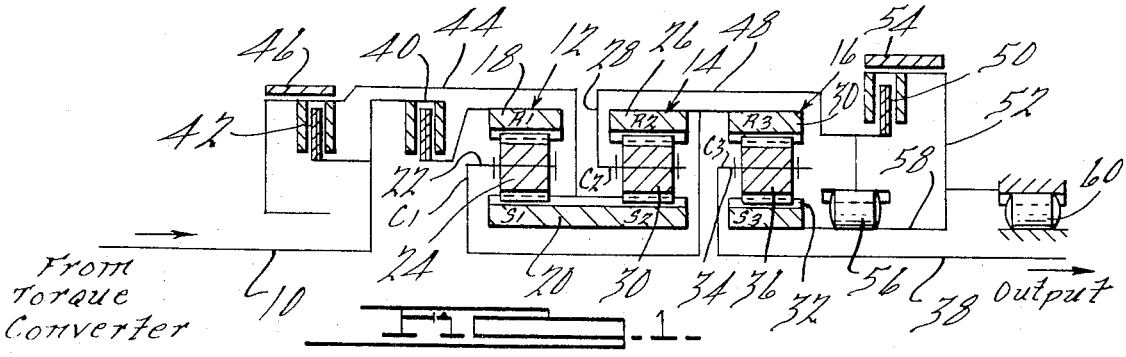

FIG. 1

FIG. 2

| | | | |
|---|---|---|---|
| 1 | $(1+\frac{S_1}{R_1}+\frac{S_1}{R_1}\frac{R_2}{S_2})(1+\frac{S_3}{R_3})$ | 2.46×1.46 | 3.58 |
| 2 | $(1+\frac{S_1}{R_1})(1+\frac{S_3}{R_3})$ | 1.46×1.46 | 2.12 |
| 3 | $(1+\frac{S_3}{R_3})$ | 1.46 | 1.46 |
| R | $-\frac{R_2}{S_2}(1+\frac{S_3}{R_3})$ | -2.18×1.46 | -3.18 |

TORQUE

| Ratio | $R_1$ | $S_1$ | $C_1$ | $R_2$ | $S_2$ | $C_2$ | $R_3$ | $S_3$ | $C_3$ | CL 40 | 2nd Band | CL 42 | Rear Band | CL 50 | O.W.C. 56 | O.W.C. 60 | |
|---|---|---|---|---|---|---|---|---|---|---|---|---|---|---|---|---|---|
| 1 | 1 | .46 | 1.46 | 1 | .46 | 1.46 | 2.46 | 1.12 | 3.58 | 1 | | | | HB | 1.46 | 2.58 | |
| 2 | 1 | .46 | 1.46 | 0 | 0 | 0 | 1.46 | .66 | 2.12 | 1 | .46 | | | | | .66 | |
| 3 | .685 | .315 | 1 | 0 | 0 | 0 | 1 | .46 | 1.46 | .685 | | .315 | | | | .46 | |
| 4 | .62 | .28 | .90 | .215 | .10 | .315 | .685 | .315 | 1 | .62 | | .38 | | .315 | | | |
| R | 0 | 0 | 0 | 2.18 | 1 | 3.18 | 2.18 | 1 | 3.18 | | | 1 | 4.18 | 3.18 | | | |

FIG. 3

SPEED

| Ratio | $R_1$ | $S_1$ | $C_1$ | | $R_2$ | $S_2$ | $C_2$ | | $R_3$ | $S_3$ | $C_3$ | | | | | | |
|---|---|---|---|---|---|---|---|---|---|---|---|---|---|---|---|---|---|
| 1 | 1 | -.89 | .41 | | .41 | -.89 | 0 | | .41 | 0 | .28 | | | | | | |
| 2 | 1 | 0 | .685 | | .685 | 0 | .47 | | .685 | 0 | .47 | | | | | | |
| 3 | 1 | 1 | 1 | | 1 | 1 | 1 | | 1 | 0 | .685 | | | | | | |
| R | -1.13 | 1 | -.46 | | -.46 | 1 | 0 | | -.46 | 0 | -.315 | | | | | | |

FIG. 4

INVENTORS:
Harry A. Kepner
Po-Lung Liang
BY:
John A. Fuchner
and David J. Harrington
ATTORNEYS.

| Ratio | $C_1$ | $C_2$ | $C_3$ | $B_1$ | $B_2$ | O.W.C 60' | Sample Ratio |
|---|---|---|---|---|---|---|---|
| 1 | | × | | | × | × | 3.32 |
| 2 | | × | | × | × | | 1.97 |
| 3 | × | × | | | × | | 1.35 |
| 4 | × | × | × | | | | 1.00 |
| R | × | | × | | × | | 2.94 |
| L | | × | × | | × | | 3.32 |

INVENTORS:
Harry A. Kepner.
Po-Lung Liang.
BY: John A. Faulkner
and Donald J. Lenkszus
ATTORNEYS.